United States Patent Office 3,087,417
Patented Apr. 30, 1963

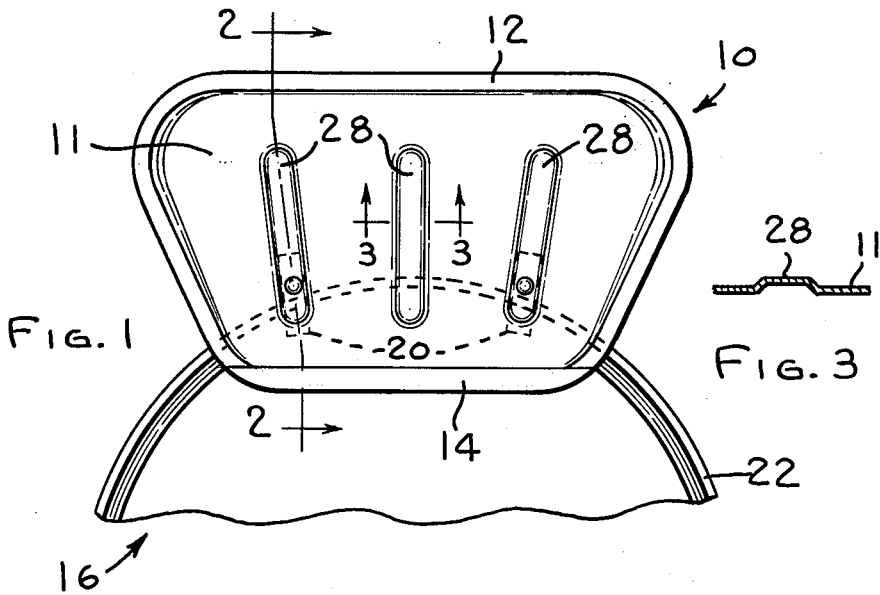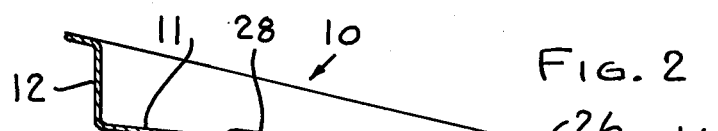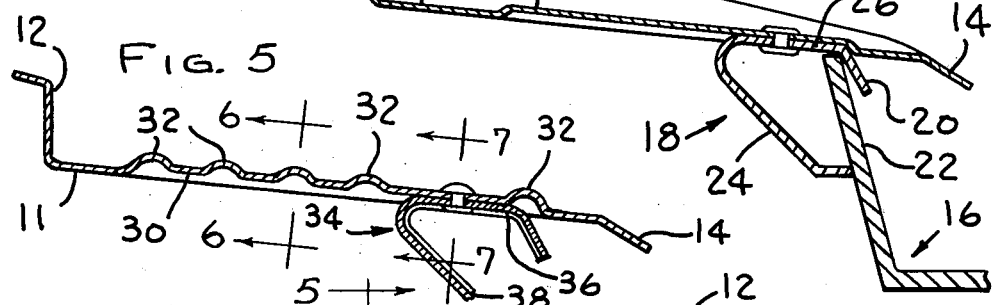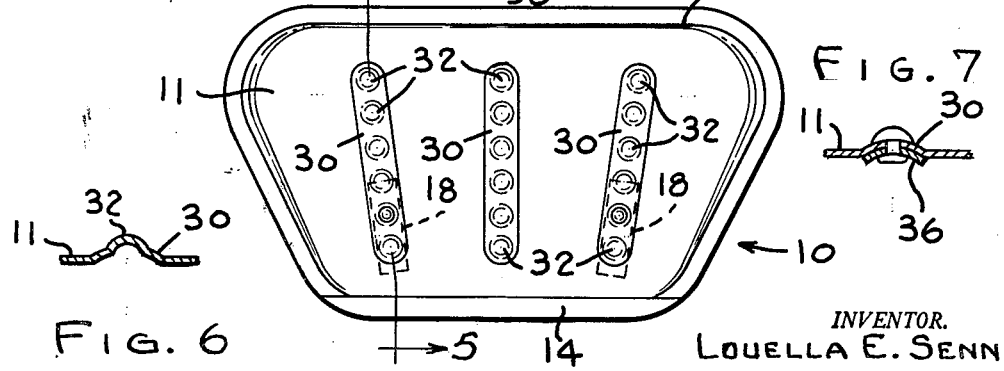

3,087,417
DRAIN TRAY
Louella E. Senn, Knoxville, Tenn., assignor, by mesne assignments, to Pantray, Inc., Milwaukee, Wis., a corporation of Wisconsin
Filed July 30, 1959, Ser. No. 830,576
2 Claims. (Cl. 99—355)

This invention relates to a tray for draining the grease from fried food and storing and keeping hot cooked foods, and particularly to such a tray which is temporarily carried on the wall of the fry pan or cooking utensil.

In draining grease from fried foods in the usual way, the food often cools to an unwanted extent and grease is often dropped on stove tops, tables, floors, children, etc., while transferring hot fried food from the cooking utensil to the place where it is to be drained. Even when cooked food does not require draining it is desirable to keep it warm while additional food is being cooked in the same utensil and transferring such food from the cooking utensil to a warming pan is inconvenient and involves the risk of dropping the food.

One object of this invention is to provide a tray for draining and/or storing cooked food which, when in use, is mounted on the wall of the cooking utensil.

A second object is to provide such a tray which can be mounted on cooking vessels of various shapes, is easily adjusted for good draining, strong and light, and easily stored when not in use.

These objects are accomplished by providing the tray with a plurality of raised protrusions which engage the food and with hooks having a short leg fitting over the edge of the utensil wall and a long curved leg which engages the outside of such wall. These protrusions raise the food from the surface of the tray to permit the grease or water, etc., to drain onto such surface and minimize capillary fluid retention. These protrusions also tend to prevent food from sliding off the tray and make the tray more rigid allowing it to be made of light weight metal. The bottom of the tray is inclined and the inclination adjusted by bending the long curved legs of the hanger hooks so that the liquid drains off the tray back into the cooking utensil. The tray and hooks are made of highly conductive metal and a large area of each hook is in conductive contact with the pan. The hooks are placed inwardly of the inner lip of the tray so that a substantial area of the tray overlies the cooking utensil so that the heat of the utensil is both conducted and radiated to the tray and the food thereon. It is desirable to use only two hooks and this together with the adjustments obtained by slight bending permits the tray to be mounted on the wall of round or square shaped frying pans or cooking utensils. Since the tray is so mounted there is no dripping or loss of grease in transferring the cooked food from the cooking utensil to the tray.

Other objects and advantages will be pointed out in, or be apparent from, the following specification and claims in which:

FIG. 1 is a top view of a tray embodying the present invention mounted on the wall of a cooking utensil;

FIG. 2 is a fragmentary sectional view taken on line 2—2 of FIG. 1 showing how the hangers engage the side or wall of a cooking utensil;

FIG. 3 is a sectional view taken on line 3—3 of FIG. 1 showing one form of raised protrusions;

FIG. 4 is a top view of a tray having a modified form of raised protrusions;

FIG. 5 is a sectional view taken on line 5—5 of FIG. 4;

FIG. 6 is a fragmentary sectional view taken on the line 6—6 of FIG. 5; and

FIG. 7 is a sectional view taken on the line 7—7 of FIG. 5.

Referring to the drawings, a tray 10 of die-formed aluminum is shown mounted on a cooking utensil 16 with its bottom 11 inclined downwardly toward such utensil to let fluids on the bottom drain into the utensil. The tray 10 has a low wall 12 around its periphery except on the side of the tray which overlies the utensil. This side has a downwardly sloping flat portion with a straight edge. This portion and edge form a draining lip which will overlie the bottom of either round or square shaped frying pans. The tray is held on a side or wall 22 of the utensil by a pair of spaced hooks 18. Each hook is made of metal such as aluminum and has a short leg 20 which laps over the top of the wall 22 and a long curved leg 24 which bears against the outside of such wall. These long legs have outwardly facing ends in contact with the wall 22 at least half way down its side and have heat conductive contact with such wall near the bottom where the heat is higher. Hook legs 20 have sufficient strength to hold the tray but the long leg 24 can be bent to adjust and maintain the inclination of the tray to the utensil. Legs 20 and 24 are connected by a flat connector bridge 26 which is riveted or welded against the bottom 11 to provide a strong connection and a good heat conducting juncture.

The bottom 11 has raised protrusions which, in this embodiment, are elongated spaced ribs 28 which extend toward the lip 14. Such protrusions keep part of the food, such as fried bacon, from contact with the bottom 11 to permit the grease to drain back to the utensil 16 over the lip 14. Such ribs lessen the capillary action which tends to retain the grease and fluid from draining from the food and also strengthen the bottom 11 permitting use of lighter weight material.

As shown in FIGS. 1 to 3, inclusive, the ribs 28 have flat tops. However, it is preferable to make the ribs of arcuate cross section such as shown in the modification of FIGS. 4 to 7, inclusive. In this modification the ribs 30 have an arcuate shape as shown in FIGS. 6 and 7 and a series of dimples 32 are raised from the curved top of such ribs. This aids in keeping food from sliding down the incline and provides a surface which is readily cleaned.

In the modification of FIGS. 4 to 7, inclusive, the hooks indicated generally at 34 have a curved cross section in the bridge portion 36 and long leg 38 to lessen the flexibility and add more strength without increased weight. However, the legs 38 may be bent for adjustment the same as the legs 24 of the other modification.

The features of this tray are: its easy mounting on cooking utensils of varying shapes; the efficiency in which fluids drain from cooked foods placed on it back to the cooking utensil; and the manner in which heat is transferred from the cooking utensil to the tray so that food on such tray may be kept warm while draining and while additional food is being cooked in the same utensil.

Although but two embodiments of this invention have been illustrated and described, it will be apparent to those skilled in the art that various changes and modifications may be made therein without departing from the spirit of the invention or from the scope of the appended claims.

I claim:
1. A food draining device adapted to be mounted on the side of a round or square shaped cooking utensil comprising, a metal tray for supporting food having its surface leading to a downwardly sloping draining lip having a flat portion with a straight edge, and hanger means consisting of two hooks each having a first leg adapted to hook onto the top of the side of the cooking utensil and a second longer curved leg, its end adapted to rest against the outside of a side of the cooking utensil near the bottom thereof, said hooks having a bridge connecting said legs and secured to the bottom of said tray inwardly of said draining lip, said tray having elongated spaced ribs formed upwardly from the bottom of said tray and providing recesses in the lower surface of said bottom, said ribs having an arcuate shaped cross section with upwardly projecting dimples to hold food on said tray spaced from the inclined surface.

2. The combination according to claim 1 in which said bridges connecting said legs are secured to said bottom within said recesses.

References Cited in the file of this patent

UNITED STATES PATENTS

| | | |
|---|---|---|
| 2,262,538 | Olson | Nov. 11, 1941 |
| 2,529,257 | Kerby | Nov. 7, 1950 |
| 2,579,065 | Channel | Dec. 18, 1951 |
| 2,590,793 | Rigstad | Mar. 25, 1952 |

FOREIGN PATENTS

| | | |
|---|---|---|
| 415,100 | Great Britain | Aug. 17, 1934 |